May 24, 1938.   S. W. HAILEY   2,118,603
PARACHUTE EQUIPPED AIRCRAFT
Original Filed Aug. 13, 1936   4 Sheets-Sheet 1

Inventor
S. W. Hailey

Attorney

May 24, 1938. S. W. HAILEY 2,118,603
PARACHUTE EQUIPPED AIRCRAFT
Original Filed Aug. 13, 1936 4 Sheets-Sheet 2
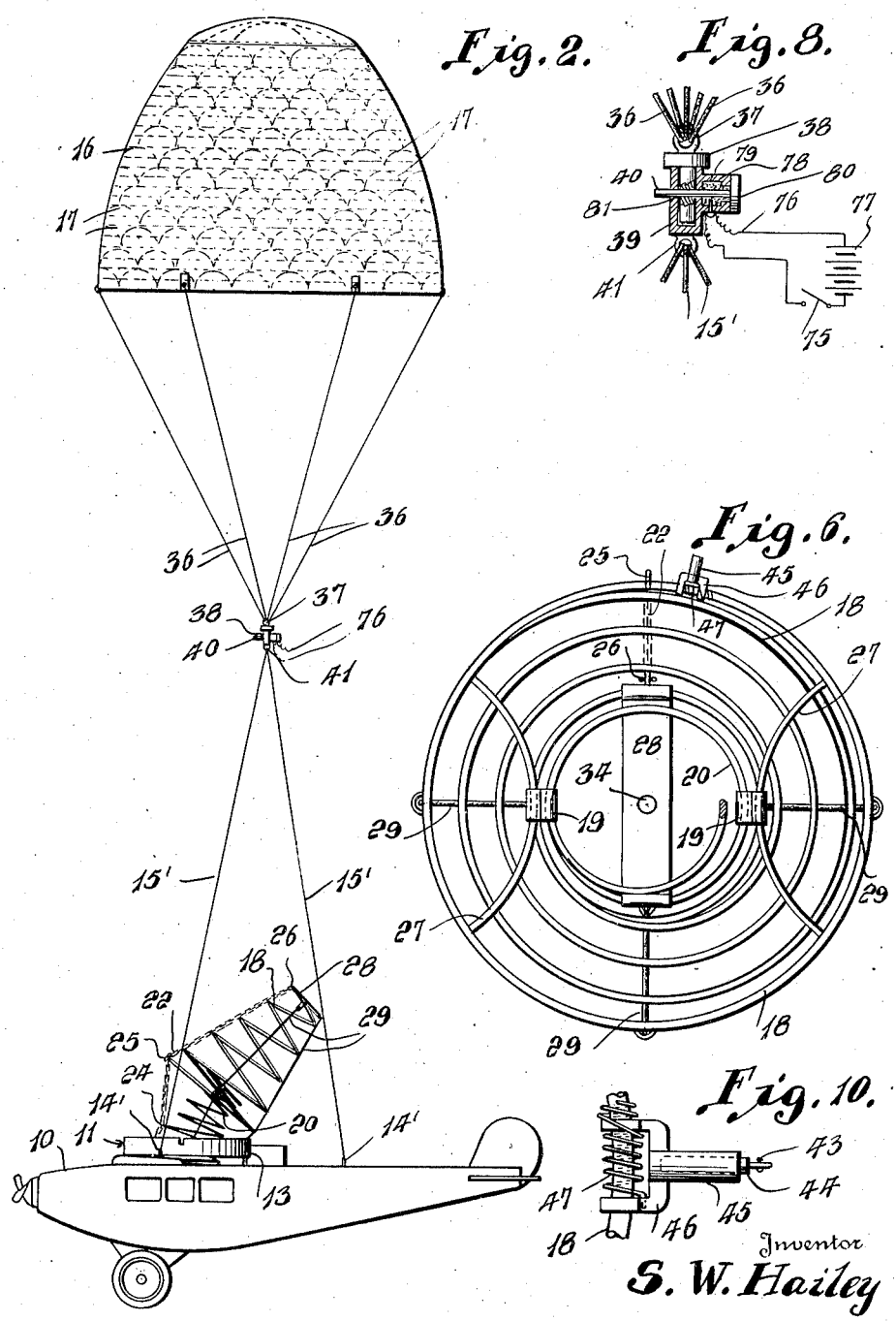

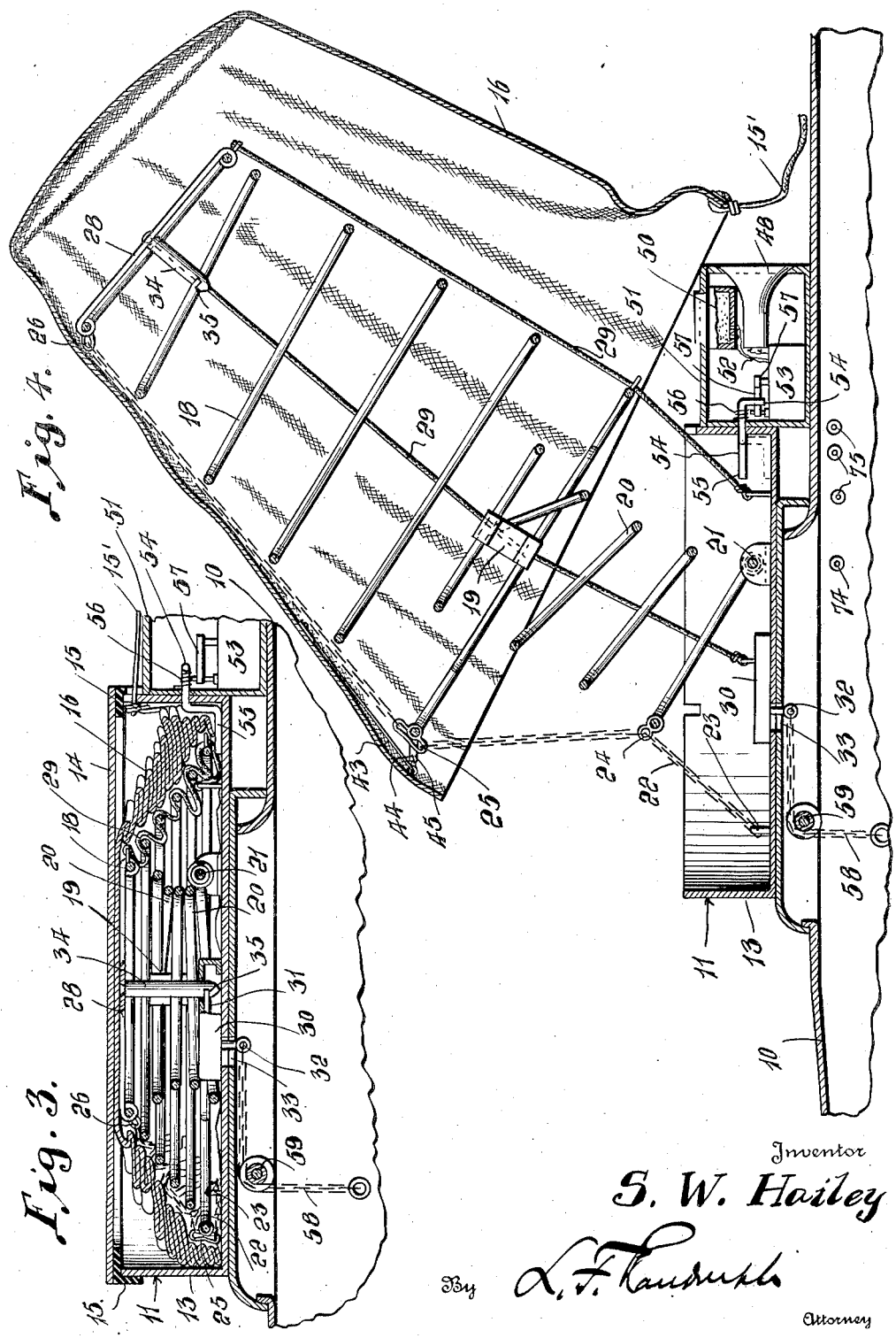

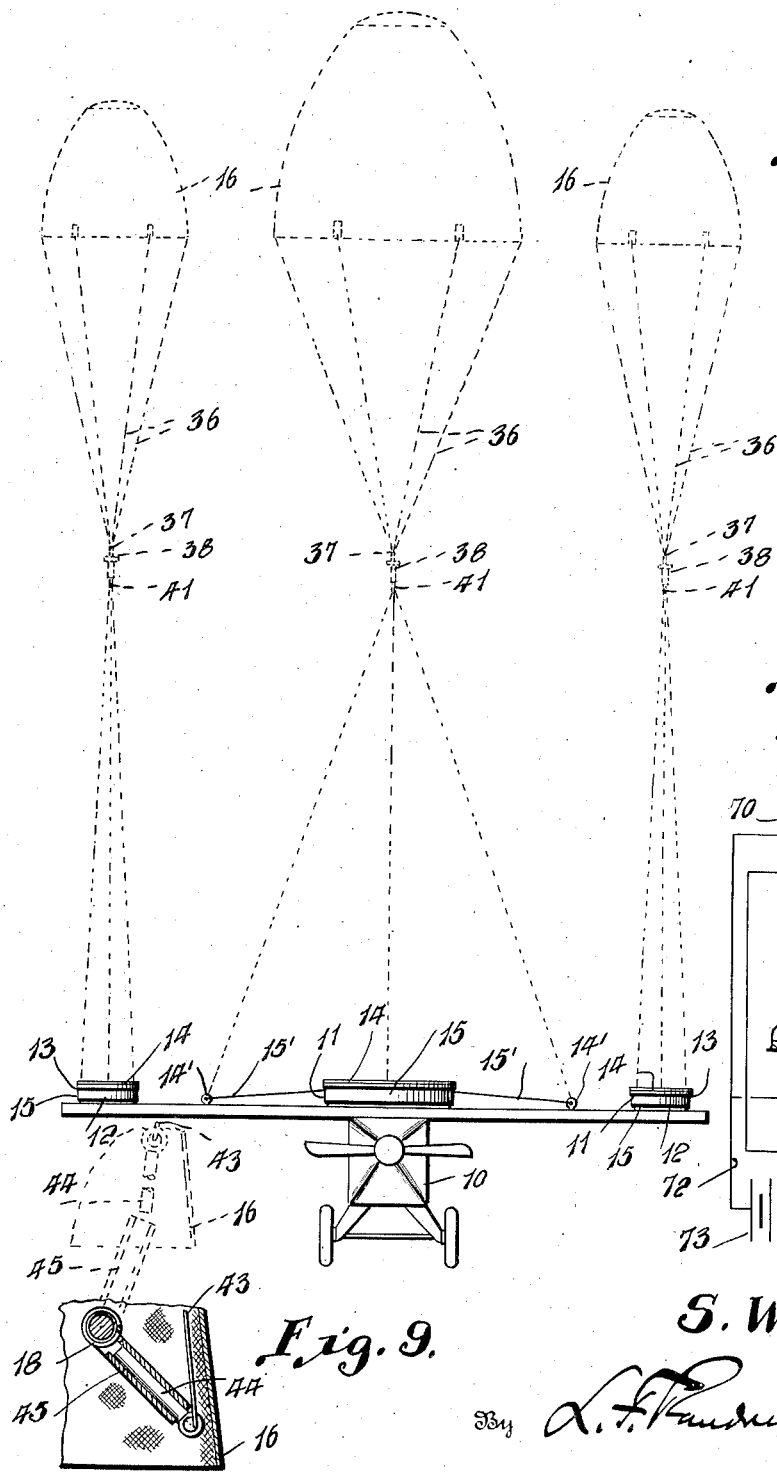

Patented May 24, 1938

2,118,603

UNITED STATES PATENT OFFICE 2,118,603

PARACHUTE EQUIPPED AIRCRAFT

Sam William Hailey, Baltimore, Md., assignor of ten percent to Charles E. Watts, ten percent to William H. Watts, and twenty percent to William E. Mason, all of Baltimore, Md.

Application August 13, 1936, Serial No. 95,911
Renewed January 22, 1938

11 Claims. (Cl. 244—139)

This invention relates to aircraft and it aims to provide a novel construction involving one or more parachutes adapted to be released in the event of impairment in order to function as a buoyant means to enable the aircraft to remain vertical and descend slowly and safely to land.

It is further aimed to provide a construction wherein inflation of the parachute is insured and bodily movement thereof relative to the aircraft is delayed until the parachute is sufficiently inflated; a construction wherein operation of the parachute is accompanied by an audible signal and also by the emission of smoke to attract the attention of bystanders; to provide a construction to completely release the parachute or parachutes in the event the aircraft is repaired before a landing is made; to provide a construction wherein the parts are normally retracted and held in a position and condition offering no interference to flight, and a construction which is generally improved and more efficient.

Various additional objects and advantages will become apparent from a consideration of the description following taken in connection with accompanying drawings illustrating an operative embodiment.

In said drawings:—

Figure 2 is a side elevation of an aeroplane equipped with my improvements, one of the parachutes being shown in operative position;

Figure 3 is an enlarged longitudinal sectional view taken substantially on the line 3—3 of Figure 1;

Figure 4 is a longitudinal sectional view taken through the same parts as Figure 3 but showing the parachute in the act of release and inflation;

Figure 6 is an enlarged plan view of the main parachute ejecting spring;

Figure 8 is an enlarged detail, partly in section, of the means for releasing the parachute;

Figure 9 is a fragmentary longitudinal section of the means for maintaining the parachute retracted until inflated to a predetermined degree;

Figure 10 is a plan view of the means for maintaining the parachute retracted until inflated to a predetermined degree;

Figure 11 is a front elevation of an aeroplane equipped with my improvements, the parachute being shown in operative position in dotted lines, and Figure 12 is a detail diagrammatic view of the means for operating the auxiliary parachutes.

Figure 1:
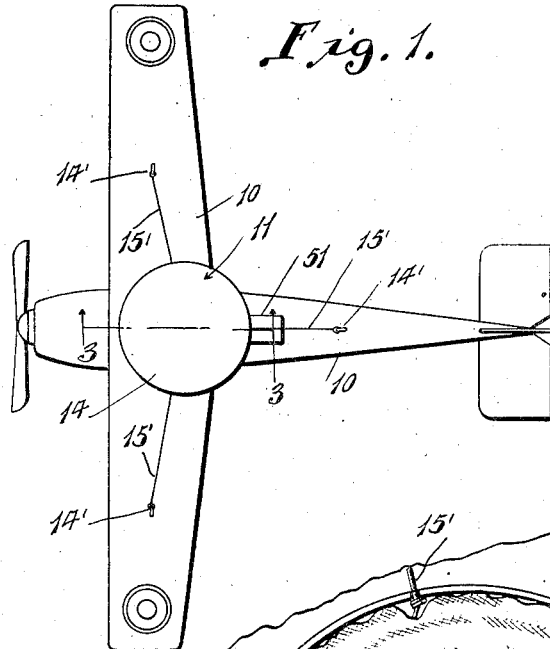
Figure 1 is a plan view of an aeroplane equipped with my improvements.
Figure 5:
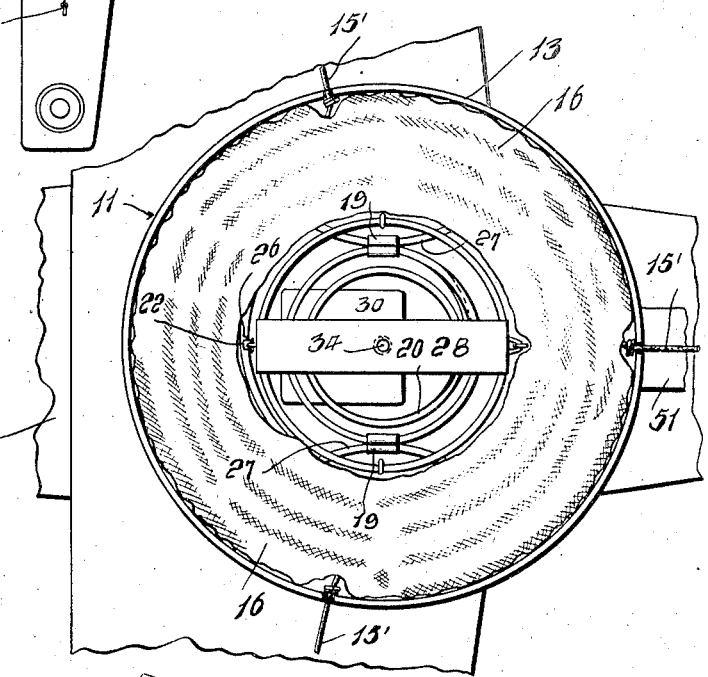
Figure 5 is an enlarged plan view showing the main parachute and adjacent parts of the aeroplane, the cover for the parachute being removed to disclose details.
Figure 7:
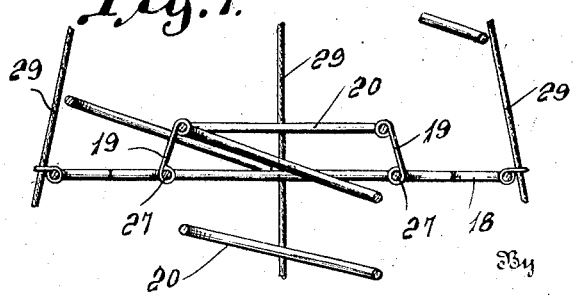
Figure 7 is an enlarged longitudinal sectional view through a fragment of said spring of Figure 6.

Referring specifically to the drawings, 10 designates an aeroplane or other aircraft which is provided substantially centrally of its main plane with a parachute means 11 and optionally equipped at the ends of such plane with auxiliary parachute means 12. The parachute means 11 and 12 are similar although differing in dimensions, the parachute means 11 being preferably operated manually while the parachute means 12 are preferably operated simultaneously and electrically.

Each of the parachute means includes a casing 13 attached to the plane 10 and normally closed by a cover 14 which is readily removable, and engaged with the casing 13 by means of a rubber or similar gasket 15, thus being of a type which will not unduly bind or freeze.

Suitably anchored to the plane as at 14' are cables 15' which extend interiorly of the casing 13 through openings in the casing wall and gasket 15 and interiorly of which casing 13 the cables 15' are connected to a parachute 16. The parachute is of any desired flexible material for instance textile fabric and it is in the form of a hood as best shown in Figure 4, being open solely at the lower end. Such hood or parachute is reenforced by rows of stitching as at 17, the stitching usually being of hemp strands or the like, preferably being saturated with paraffine oil or other strengthener and preserver.

Located within the parachute 16 is a relatively large expansive coil spring 18, the same being frustum conical as shown in Figure 4, when expanded. Connected to coils of said spring 18 as by means of clamps 19 is another coil spring 20, the longitudinal axis thereof being at a slight angle to the longitudinal axis of the spring 18 as best shown in Figure 4. One coil of the spring 20 as at 21, is connected by means of a spring hinge to the bottom of the casing 13 and the spring hinge normally urges the spring 20 outwardly to the inclined position shown in Figure 4.

Such outward movement however is limited by means of a metallic chain or other flexible element 22 anchored at 23 to the bottom of casing 13 and connected to a ring 24 on one end of the lowermost coil of spring 20, the chain being also connected by means of links 25 and 26 to the lowermost and uppermost coils of the spring 18. Arcuate portions 27 attached to the spring 18, are directly engaged by the clamps 19. The connection 26 is made to a crossbar 28 extending diametrically across the uppermost coil of spring 18. A plurality of resilient cords 29 are anchored to the casing 13, one of them to the bar 28 and the remainder to the uppermost coil of spring 18.

Located on the base of the casing 13 is a lock device 30 in the casing of which a bolt 31 is normally projected by a spring and adapted to be retracted through sliding of a depending lug 32 passing through enlarged openings 33 of said bottom of the casing and the adjacent wall of the plane. A stud 34 depends from the bar 28 and the parts are normally adapted to be located within the space of the casing 13, and the cover 14 applied to such casing as shown in Figure 3. In such position, the stud 34 extends into the lock casing and at a notch 35, is engaged by the bolt 31, which prevents the operation of the parachute, holding all of the parts retracted.

Extending from the parachute 16 are flexible cables or ropes 36 all of which are attached to an eyelet 37 of a coupling 38. Said coupling 38 engages a socket of a coupling 39, being normally held attached thereto by means of a pin or connecter 40. The previously mentioned cables 15' are attached to an eyelet 41 on the coupling 39.

Means are provided so that the parachute cannot move too far initially upon release, with respect to the plane, thus insuring proper inflation thereof.

To this end one or more ropes or cables 43 are attached to the parachute and extend below the lower end thereof and are connected to a plug 44 removably telescoped within a tubular arm 45 of a yoke 46 journaled on the lowermost coil of the spring 18. A coil spring 47 is coiled about a portion of the yoke and the lowermost coil of spring 18 and it normally urges the yoke to the downwardly inclined position shown in Figure 9. As a result, the parachute cannot ascend until it is sufficiently inflated to overcome the holding effect of the spring 47. When it is sufficiently inflated, cable 43 and parts 44 and 45 are drawn upwardly past the horizontal to the dotted line position of Figure 9, whereupon the plug 44 is pulled loose from the tube 45.

When the parts are released for operation in the event of disablement of the aeroplane, an audible signal is given by a suitable horn 48 and at the same time, a stream of smoke is emitted through the ignition of a smoke cartridge 50, such signalling means 48 and cartridge 50 being carried by a housing or casing 51 adjacent to the casing 13. Said horn 48 and cartridge 50 are in an electric circuit utilizing conductors 52, deriving current from an electric battery as at 53, which circuit is controlled by a switch member 54. Said switch member is normally in an open position as shown in Figure 3. It is journaled in the walls of casings 13 and 51 and has a crank 55 located within the casing 13 and engaged by the lowermost coil of the spring 18, when the latter is compressed, as shown in Figure 3, thus holding the switch member elevated at the opposite or circuit closing end. A spring 56 associated with the switch member 54, urges closing movement thereof into engagement with a contact 57, so that when the parachute is released, the switch member 54 will be released and under the urgency of spring 56 will engage the contact 57 and close an electric circuit through the battery 53, signal 48 and smoke cartridge 50.

The release or operation of the central parachute is effected by a pull on a pendant chain or other flexible element 58 connected to the lug 32 and trained over guide pulleys 59.

In the operation of the device, chain 58 is pulled, which slides or retracts the bolt 31, thereby disengaging the stud 34, whereupon the springs 29 and 18 expand to the position shown in Figure 4, the difference in the longitudinal axes of said springs serving to angularly dispose the spring 18 with the entrance to the parachute 16 open to some extent so as to become inflated. The element 58 is only operated of course in the event the aeroplane becomes disabled. The parachute remains in the position of Figure 4 until it is sufficiently inflated whereupon it will draw the cable 43 and plunger 44 above the horizontal to the dotted line position of Figure 9, disengaging the yoke 46 and permitting the parachute, through impingement with the air to rise to the position shown in Figures 2 and 11 where it will provide a buoying effect on the aeroplane, enabling it to descend in a vertical or normal position with safety. It will be realized that simultaneously with the release of the parachute, that the disengagement of the crank 55 by spring 18, will enable the switch 54 under the action of spring 56 to move to a position engaging contact 57 and thereby closing a circuit giving an audible signal through the horn 48 and the emission of smoke at the cartridge 50, the signal and smoke tending to attract the attention of those in the vicinity.

It is clear that the central or main parachute mechanism may be used alone or its action may be supplemented by the auxiliary parachute mechanisms 12. I prefer to operate the auxiliary parachute mechanisms 12 simultaneously by electrical means as best diagrammatically shown in Figure 12.

To the depending lug 32 of the lock for the auxiliary parachutes, the cores 60 of solenoids 70 are connected as at 71, the windings of the solenoids being in an electric circuit 72 including an electric battery 73 and a switch 74. Said switch 74 is located at any desired or accessible location on the plane 10 or within the cabin of the aeroplane.

In some instances, the impairment of the aeroplane will be more or less of a minor nature and the repair can be made after releasing the parachutes to the dotted line position of Figure 11 or full line position of Figure 2 and before a landing is effected and perhaps under conditions where it would be unsafe to attempt a landing. It is under these conditions that the coupling mechanism 38—40 becomes important and is operated so as to completely release or detach the parachute or parachutes 16. To effect such release by the pilot, from his cabin or plane 10, a switch 75 is provided therein, being disposed in a normally open electric circuit 76 having a battery 77 therein. Said electric circuit includes a charge of powder 78 located within an enlargement 79 on the coupling 39 and contacting a head 80 on the pin 40. Said circuit 76 includes an ignition element 81 extending into the charge 78.

It will be clear that when it is desired to release the parachute or parachutes, that the switch 75 corresponding thereto, there being a switch for each of them, is closed, thereby igniting the charge 78 in the circuit thereof and through the explosion of such charge against the head 80, ejecting and removing the connecting pin 40 and permitting the parachute because of the impingement with the air, to raise the coupling 38 out of engagement with the coupling 39. Under such circumstances, the parachute or parachutes will be lost and it will be observed that in the use of any of the parachutes, that the covers 14 will be automatically opened by the parachutes and such covers also lost.

Various changes may be resorted to provided they fall within the spirit and scope of the invention.

I claim as my invention:—

1. In a parachute mechanism of the class described, a casing, a spring frame within the casing, a parachute member disposed over said frame, and releasable means to normally maintain said spring frame retracted within said casing, said spring frame comprising a plurality of upstanding, nested-spring elements connected together and having their longitudinal axes arranged at an angle to each other for the purpose specified.

2. In a parachute mechanism of the class described, a casing, a spring frame within the casing, a parachute member disposed over said frame, releasable means to normally maintain said spring frame retracted within said casing, said spring frame comprising a plurality of spring elements connected together and having their longitudinal axes arranged at an angle to each other for the purpose specified, a spring hinge connecting the lowermost spring element to the casing, the spring of said spring hinge urging upward swinging movement thereof, and means limiting the upward swinging movement of said frame.

3. In a parachute mechanism of the class described, a casing, a spring frame within the casing, a parachute member disposed over said frame, releasable means to normally maintain said spring frame retracted within said casing, said spring frame comprising a plurality of spring elements connected together and having their longitudinal axes arranged at an angle to each other for the purpose specified, a spring hinge connecting the lowermost spring element to the casing, the spring of said spring hinge urging upward swinging movement thereof, and means limiting the upward swinging movement of said frame, consisting of a flexible element, and elastic means connected to the casing and to the frame.

4. In a parachute mechanism of the class described, a casing, a spring frame within the casing, a parachute member disposed over said frame, releasable means to normally maintain said spring frame retracted within said casing, said spring frame comprising a plurality of spring elements connected together and having their longitudinal axes arranged at an angle to each other for the purpose specified, a spring hinge connecting the lowermost spring element to the casing, the spring of said hinge urging upward swinging movement thereof, and means limiting the upward swinging movement of said frame, consisting of a flexible element, and elastic means connected to the casing and to the frame, a bar on the frame to which the flexible element is connected and to which the elastic means is connected, the first mentioned means comprising a lock, and a stud on said bar coacting with said lock.

5. In a parachute mechanism of the class described, a casing, a spring frame within the casing, a parachute member disposed over said frame, releasable means to normally maintain said spring frame retracted within said casing, said spring frame comprising a plurality of spring elements connected together and having their longitudinal axes arranged at an angle to each other for the purpose specified, a hinge connecting the lowermost spring element to the casing, the spring of said spring hinge urging upward swinging movement thereof, and means limiting the upward swinging movement of said frame, consisting of a flexible element, and elastic means connected to the casing and to the frame.

6. In a parachute mechanism of the class described for an aeroplane, a casing on the aeroplane, a spring frame within the casing, a parachute member attached to the aeroplane and disposed over said frame, and releasable means to normally maintain said spring frame retracted within said casing, and signal means operable automatically through the release of the parachute.

7. In a parachute mechanism of the class described for an aeroplane, a casing, a spring frame within the casing on the aeroplane, a parachute member attached to the aeroplane and disposed over said frame, and releasable means to normally maintain said spring frame retracted within said casing, and means operable to produce smoke automatically through the release of the parachute.

8. In a parachute mechanism of the class described, a casing, a spring frame within the casing, a parachute member disposed over said frame, and releasable means to normally maintain said spring frame retracted within said casing, signal means, a switch element controlling operation of the signal means, said switch element normally seeking a closed position, and said switch element being engaged and held in open position by said frame when retracted.

9. In a parachute mechanism of the class described, a casing, a spring frame within the casing, a parachute member disposed over said frame, and releasable means to normally maintain said spring frame retracted within said casing, and means to hold the parachute on the frame releasable upon inflation of the parachute to a predetermined degree, comprising a yoke mounted on the frame, a coil spring normally maintaining the yoke in a downward inclination, said yoke having a tubular portion, a plunger disposed in said portion, a cable connecting the plunger to the parachute, said plunger being releasable upon elevation of the yoke past the vertical through impingement of the parachute with the air.

10. In a parachute mechanism of the class described, a casing, a spring frame within the casing, a parachute member disposed over said frame, and releasable means to normally maintain said spring frame retracted within said casing, cable means to connect the parachute to aircraft, said cable means having separable portions connected to separate couplings, means securing the couplings together, means to position an explosive charge about the last mentioned means, and mechanism operable to ignite the last mentioned means to release the coupling means to thereby free the parachute.

11. Safety parachute mechanism for an aeroplane or the like comprising a parachute, cable means to connect the same to an aircraft, said cable means being in separate portions, each portion being connected to a different coupling, a connector securing the couplings detachably together, means to hold an explosive charge about the connecting means, and means operable to ignite the charge to eject the connecting means to thereby release the parachute.

SAM WILLIAM HAILEY.